(12) United States Patent
Ishihara

(10) Patent No.: US 7,032,284 B2
(45) Date of Patent: Apr. 25, 2006

(54) ASSEMBLING METHOD OF MAGNETIC TAPE CARTRIDGE AND COMPONENT HOLDING JIG THEREFOR

(75) Inventor: Yusuke Ishihara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 351 days.

(21) Appl. No.: 10/682,883

(22) Filed: Oct. 14, 2003

(65) Prior Publication Data
US 2004/0123452 A1    Jul. 1, 2004

(30) Foreign Application Priority Data
Oct. 15, 2002    (JP)    ............... 2002-300581

(51) Int. Cl.
*B23P 11/02*    (2006.01)
(52) U.S. Cl. .............. 29/436; 29/450; 29/464; 29/469; 29/806
(58) Field of Classification Search ............. 29/434, 29/436, 450, 464, 469, 806
See application file for complete search history.

(56) References Cited

U.S. PATENT DOCUMENTS

| 6,948,674 B1* | 9/2005 | Yamamoto | 242/348 |
| 2004/0178291 A1* | 9/2004 | Iino | 242/348.2 |

* cited by examiner

*Primary Examiner*—David P. Bryant
(74) *Attorney, Agent, or Firm*—Sughrue Mion, PLLC (57) ABSTRACT

The present invention provides an assembling method facilitating building-in work of a door and tensile coil spring in a cartridge case. In an assembling of a magnetic tape cartridge, hold the door and coil spring with a component holding jig, grip a part of the door with a robot hand of an assembling apparatus, engage the other end of the coil spring in a spring engaging portion, elongate the coil spring with moving the spring engaging portion in a closing direction, make a state in which the coil spring can be attached to the case-side spring hooking portion as it is when fitting the door in a closing position of the guide groove, then fit in the door, and attach the other end of the coil spring to the case-side spring hooking portion, thereby being able to simultaneously build the door and coil spring in a lower half.

6 Claims, 8 Drawing Sheets

ASSEMBLING METHOD OF MAGNETIC TAPE CARTRIDGE AND COMPONENT HOLDING JIG THEREFOR

FIELD OF THE INVENTION

The present invention relates to an assembling method of a magnetic tape cartridge and a holding jig used for an assembling therefor, in more particular, to the assembling method of the magnetic tape cartridge and the holding jig used for the assembling which can facilitate automation of building-in work of a door and tensile coil spring in a cartridge case.

BACKGROUND OF THE INVENTION

Conventionally, as an external recording medium for backup data of a computer and the like, there exists a magnetic tape cartridge which houses a single reel winding a magnetic tape of a recoding medium in a case (for example, see FIG. 2 in Japan paten laid open publication 11-265560).

There exist various kinds of cartridges as this kind of magnetic tape cartridge, and in these years, for a purpose of downsizing a drive unit, a magnetic tape cartridge which is composed so as to form a pulling-out port of a magnetic tape at a corner of side wall of a cartridge case and to open/close the pulling-out port by a door with a curved shape is developed to make movement space of a tape pulling-out mechanism small in the drive unit.

In such the magnetic tape cartridge, in order to open/close the door, it is thought of a structure that: the door is fitted in a groove formed in an inner surface of the cartridge case and always energized toward its closing direction by hooking a tensile coil spring across a door-side spring hooking portion provided in an inner surface of the door (surface facing inside of the cartridge case) and a case-side spring hooking portion provided in an inner surface of the cartridge case; and a protrusion piece for operation formed on an outer surface of the door (surface facing outside of the cartridge case) is pushed/moved by an operating arm appended to a loading mechanism, thereby the door being opened/closed.

Then, as a method to automate building-in work of the door and tensile coil spring in the cartridge case in manufacturing processes of magnetic tape cartridge of the structure, a building-in method which firstly grips the door with a robot hand and sets it in a guide groove, then grips the tensile coil spring with the robot hand, and attaches its one end to the door-side spring hooking portion and its other end to the case-side spring hooking portion is thought of. Meanwhile, in building in the tensile coil spring, after attaching its one end to the case-side spring hooking portion, its other end may be attached to the door-side spring hooking portion.

However, in the building-in method, if the door fitted in the guide groove oscillates and/or slants left/right, a position of the door-side spring hooking portion for the cartridge case displaces, so there exists a problem that attaching work of both ends of the tensile coil spring to the door-side spring hooking portion and the case-side spring hooking portion becomes difficult. Moreover, if a gap between the door and case-side spring hooking portion is narrow, there exists a problem that, in the attaching work of both ends of the tensile coil spring to the door-side spring hooking portion and the case-side spring hooking portion, it becomes difficult to insert the robot hand gripping the tensile coil spring between the door and case-side spring hooking portion. That is, in the building-in method, there exists a problem that the automation of building-in work of the door and tensile coil spring is difficult.

SUMMARY OF THE INVENTION

An exemplary object of the present invention is to provide an assembling method of a magnetic tape cartridge which can facilitate the automation of building-in work of a door and tensile coil spring in a cartridge case and a component holding jig used for the assembling.

An assembling method of magnetic tape cartridge of the invention is the method of a magnetic tape cartridge equipped with a cartridge case consisting of an upper half and lower half, a magnetic tape pulling-out port formed at a corner of side wall of the cartridge case, a door with a curved shape opening/closing the magnetic tape pulling-out port, a guide groove guiding the door to universally slide in its opening/closing directions, a door-side spring hooking portion provided with the door, a case-side spring hooking portion provided in an inner surface of the cartridge case, and a tensile coil spring, of which one end is attached to the door-side spring hooking portion and the other end is attached to the case-side spring hooking portion, always energizing the door in its closing direction; and is characterized in that holding the door and tensile coil spring with a component holding jig provided on a transport pallet in advance in a state in which the tensile coil spring is hooked in the door-side spring hooking portion, gripping a part of the door with a robot hand of an assembling apparatus, engaging the other end of the tensile coil spring in a spring engaging portion, elongating the tensile coil spring with moving the spring engaging portion in a closing direction, making a state in which the tensile coil spring can be attached to the case-side spring hooking portion as it is when fitting the door in a closing position of the guide groove, then fitting in the door gripped with the robot hand at the closing position of the guide groove, and attaching the other end of the tensile coil spring engaged in the spring engaging portion to the case-side spring hooking portion, thereby the door and tensile coil spring being simultaneously built in the cartridge case.

According to the assembling method of the invention, firstly grip or engage the door and tensile coil spring held with the component holding jig with the robot hand of the assembling apparatus and the spring engaging portion. Next, elongate the tensile coil spring with moving the spring engaging portion in the closing direction and make a state in which the tensile coil spring can be attached to the case-side spring hooking portion as it is when fitting the door in the closing position of the guide groove. Then, fit the door gripped with the robot hand in the guide groove, thereby the door and tensile coil spring being able to be simultaneously built in the cartridge case.

Moreover, the component holding jig of the invention is a component holding jig used for assembling the magnetic tape cartridge equipped with the cartridge case consisting of the upper half and lower half, the magnetic tape pulling-out port formed at the corner of side wall of the cartridge case, the door with the curved shape opening/closing the magnetic tape pulling-out port, the guide groove guiding the door to universally slide in its opening/closing directions, the door-side spring hooking portion provided with the door, the case-side spring hooking portion provided in the inner surface of the cartridge case, and the tensile coil spring, of which one end is attached to the door-side spring hooking portion and the other end is attached to the case-side spring hooking portion, always energizing the door in its closing direction; and is characterized in that a door holding groove and spring holding groove to hold the door and tensile coil spring in a hooked state are formed on an upper surface of the holding jig, and the spring holding groove are formed laterally long so as to elongate the tensile coil spring to a length to be attached to the case-side spring hooking portion as it is when the door is fitted in the closing position of the guide groove.

According to the component holding jig of the invention, the tensile coil spring held with the spring holding groove can be elongated to a length attachable to the case-side spring hooking portion as it is when the door is fitted in the closing position of the guide groove. Thus, in assembling the magnetic tape cartridge, the door and elongated tensile coil spring can be built in the cartridge case as it is.

BRIEF DESCRIPTION OF THE DRAWINGS

FIGS. 7A and 7B are drawings to illustrate movements in attaching the other end 7b of the tensile coil spring 7 engaged in the spring engaging portion RH2 to a case-side spring hooking portion 13: FIG. 7A shows a state in which a top end RH2a of the spring engaging portion RH2 is abutted on a top end 13a of the case-side spring hooking portion 13.

DESCRIPTION OF THE PREFERRED EMBODIMENTS

Hereinafter, one of embodiments of an assembling method and component holding jig therefor related to the present invention will be described in detail, referring to drawings as needed. Meanwhile, in the embodiment, it is assumed that a slide door and tensile coil spring is built in a lower half of a cartridge case.

Figure 1:
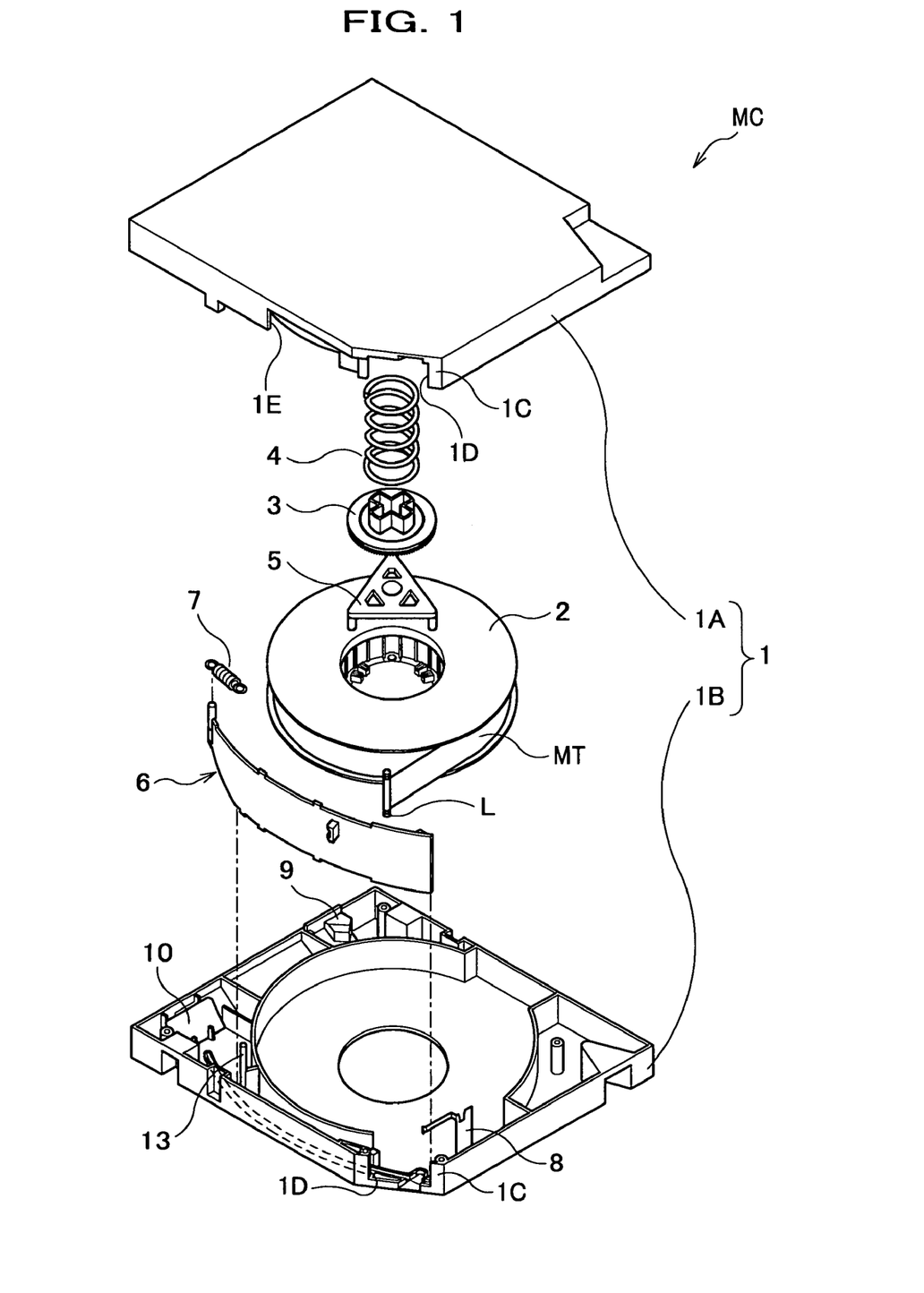
FIG. 1 is an exploded perspective view showing a configuration of a magnetic tape cartridge MC to which an assembling method of a magnetic tape cartridge related to the invention is applied.
Figure 2:
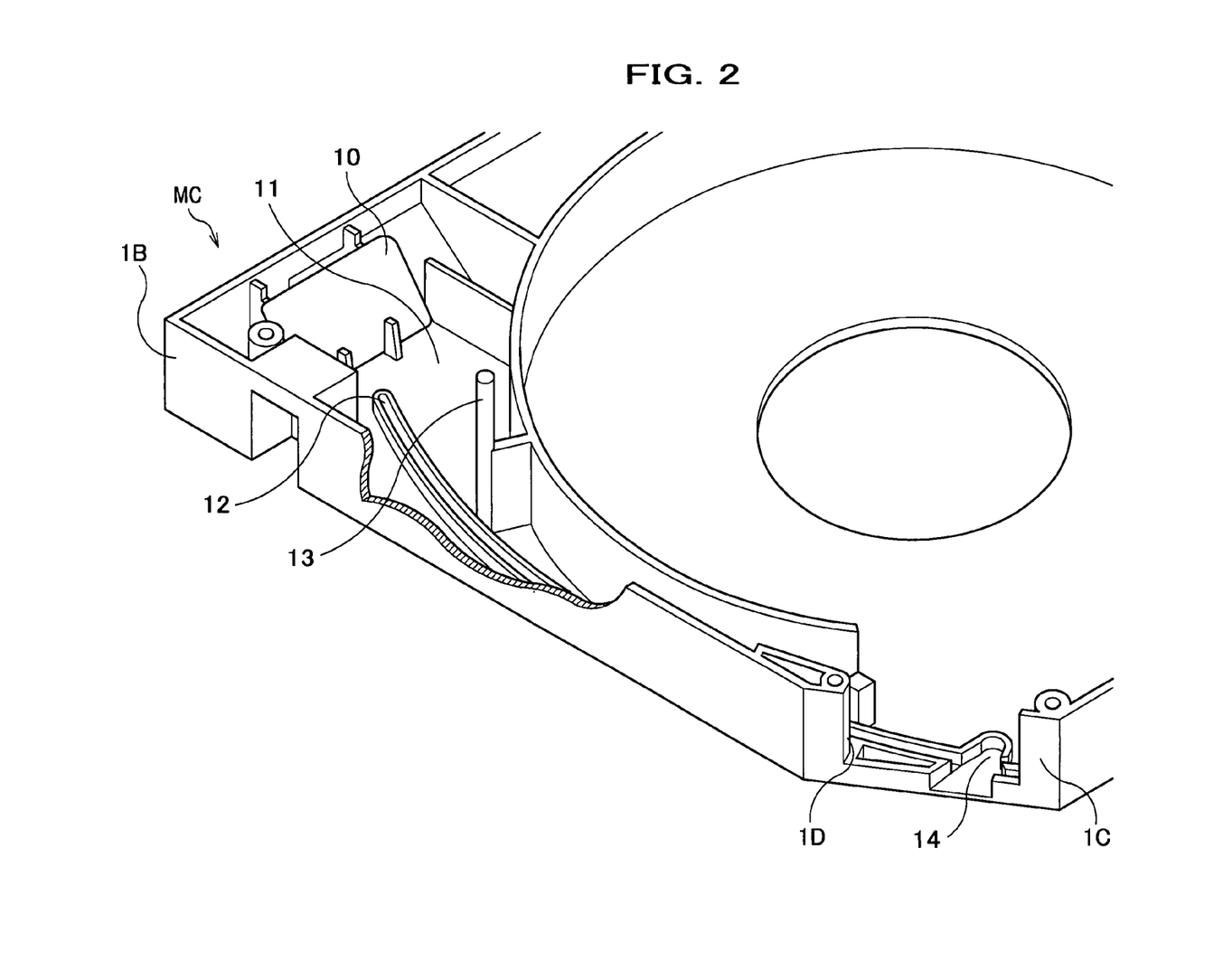
FIG. 2 is an enlarged perspective view showing a main portion of inner surface 11 of a lower half 1B included in the magnetic tape cartridge MC shown in FIG. 1.
Figure 3:
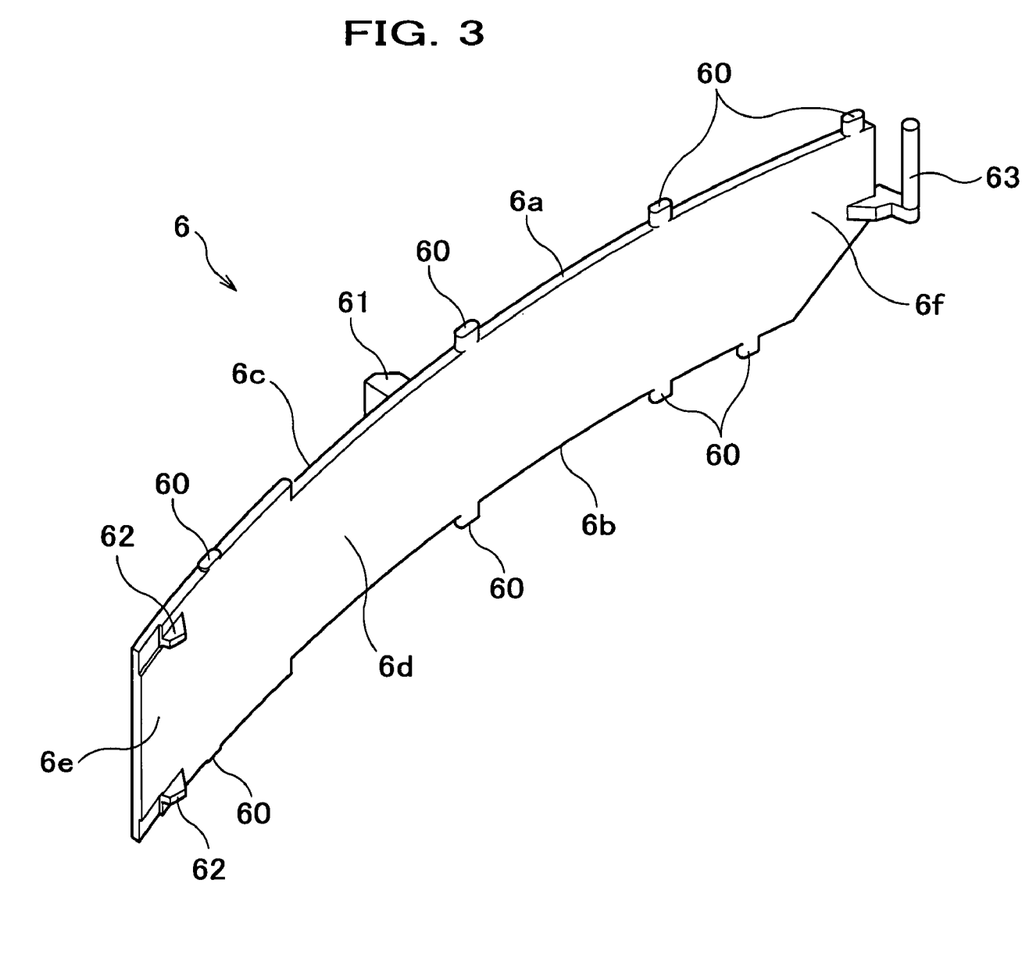
FIG. 3 is an enlarged perspective view showing a slide door 6 included in the magnetic tape cartridge MC shown in FIG. 1.

Firstly, a magnetic tape cartridge to which the assembling method related to the invention is applied is described referring to FIGS. 1 to 3.

As shown in FIG. 1, a magnetic tape cartridge MC is composed of a single reel 2 in which a magnetic tape MT of a recording medium is wound, a lock plate 3 and compressing spring 4 to lock a rotation of the reel 2, a release pad 5 to unlock the reel 2, a slide door 6 to open/close a magnetic tape pulling-out port 1D, a tensile coil spring 7 always energizing the slide door 6 in its closing direction, a disc spring 8 engaging a leader pin L attached at a top end of the magnetic tape MT in a closed state of the slide door 6, an involuntary deletion preventing claw 9, a cartridge memory 10, and the like, built in a cartridge case 1 which is divided into an upper half 1A and lower half 1B. Here, for the "upper half 1A and lower half 1B," an upper one in building-in is called the "upper half 1A," whereas a lower one is called the "lower half 1B." Meanwhile, the "slide door 6" corresponds to a "door" in claims of the invention.

The magnetic tape pulling-out port 1D is formed across the upper half 1A and lower half 1B at a corner 1C obliquely formed by a part of side wall of the cartridge case 1 being cut away (see FIG. 1). On the other hand, one end 7a and the other end 7b of the tensile coil spring are formed like a ring (see FIG. 4).

In addition, as shown in FIG. 2, a lower end 6b (see FIG. 3) of the slide door 6 is fitted in an inner surface 11 of the lower half 1B, and a curved shallow guide groove 12 guiding the slide door 6 to universally slide in its opening/closing directions in its opening/closing, a case-side spring hooking portion 13 like a pin shaped together with the inner surface 11, a leader pin holding concave portion 14 holding a lower end of the leader pin L (see FIG. 1) engaged in the disc spring 8 (see FIG. 1), and the like are formed. Although not shown in the drawings, also in an inner surface of the upper half 1A, a guide groove, case-side spring hooking portion, and leader pin holding concave portion are respectively formed corresponding to the guide groove 12 formed in the inner surface 11 of the lower half 1B, the case-side spring hooking portion 13, and the leader pin holding concave portion 14.

The slide door 6, as shown in FIG. 3, is formed like a laterally long sheet and has a curved shape in its thickness direction. Then, at the upper end 6a and lower end 6b of the slide door 6, a plurality of sliding-use protrusions 60 fitted in the guide groove 12 (see FIG. 2) formed in the upper half 1A and lower half 1B so as to universally slide are formed.

On an outer surface (surface facing outside of the magnetic cartridge MC) 6c of the slide door 6, an operating-use protrusion piece 61 performing opening operation of the slide door 6 is protrusively provided. The operating-use protrusion piece 61 fronts in a operating-use opening 1E (see FIG. 1) formed on the side wall of the upper half 1A when the magnetic tape cartridge MC is assembled, and the opening operation of the slide door 6 is performed by pushing/moving the protrusion piece 61 with an operation arm appended to a loading mechanism of a drive unit.

In an inner surface (surface facing inside of the magnetic cartridge MC) is 6d of the slide door 6, when the slide door is in a closed state, stoppers 62 holding a lower end of the leader pin L (see FIG. 1) are formed at a front end portion 6e of the door 6. Meanwhile, the "front end portion" is an end portion which becomes a closing direction side when the slide door 6 is built in the lower half 1B.

Moreover, in the inner surface 6d of the slide door 6, a door-side spring hooking portion 63 to which one end of the tensile coil spring 7 is attached at a rear end portion 6f the door 6 is protrusively provided. Meanwhile, the "rear end portion" is an end portion which becomes an opening direction side when the slide door 6 is built in the lower half 1B. The door-side spring hooking portion 63 is composed of a base end portion vertically extending in a thickness direction and a pin-shaped top end portion vertically extending in a thickness direction from a top end of the base end portion to an upper end 6a of the slide door 6. Meanwhile, a shape of the door-side spring hooking portion 63 is not specifically restricted if it allows one end of the tensile coil spring 7 to be attached.

Figure 4:
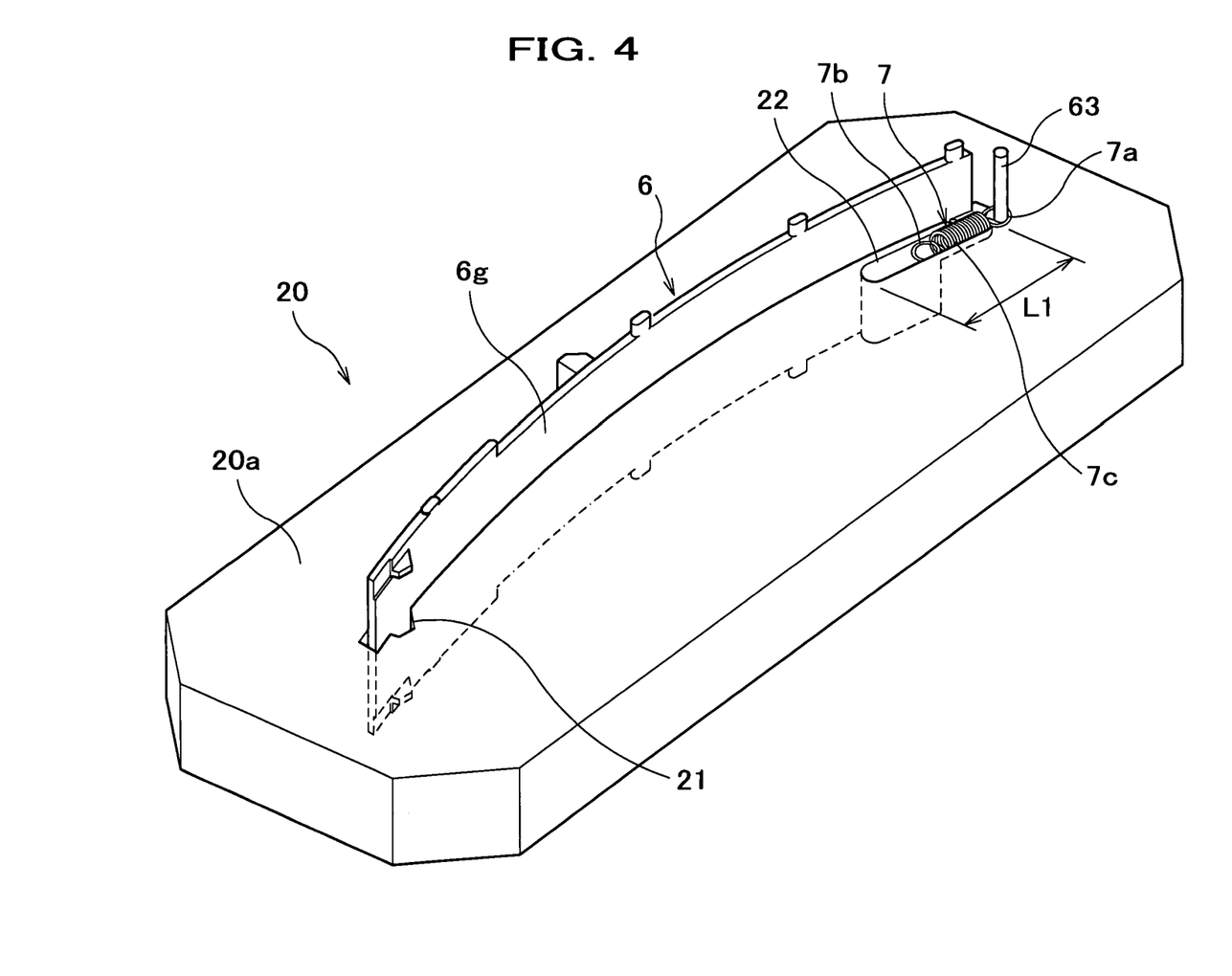
FIG. 4 is a perspective view showing a state of a component holding jig 20 with which the slide door 6 and a tensile coil spring 7 are held.

Next, a component holding jig related to the invention is described referring to FIG. 4.

When assembling the magnetic tape cartridge MC, provide on a transport pallet each component such as the upper half 1A, lower half 1B, reel 2, lock plate 3, compression coil spring 4, release pad 5, slide door 6, tensile coil spring 7, disc spring 8, involuntary deletion preventing claw 9, and cartridge memory 10, and in a building-in process of each component, build each component in a predetermined position using an assembling apparatus equipped with a robot hand. Each component is held in a state in which the robot hand of the assembling apparatus easily grips by means of a component holding jig exclusive for each component.

In a component holding jig 20 for the slide door 6, as shown in FIG. 4, a door holding groove 21 and spring holding groove 22 are formed on its upper surface 20a, and the slide door 6 is held in a vertically raised posture without a left/right tilt and front/rear slant by the door holding groove 21. Moreover, one end 7a of the tensile coil spring 7 is hooked on the door-side spring hooking portion 63 of the slide door 6, and a coil 7c of the coil spring 7 is held in a constant posture by the spring holding groove 22, that is, a posture in being attached to the case-side spring hooking portion 13 which is provided with the lower half 1B. Meanwhile, then, the tensile coil spring 7 is attached to the door-side spring hooking portion 63 in a natural state, that is, in a shrunk state.

Figure 8:
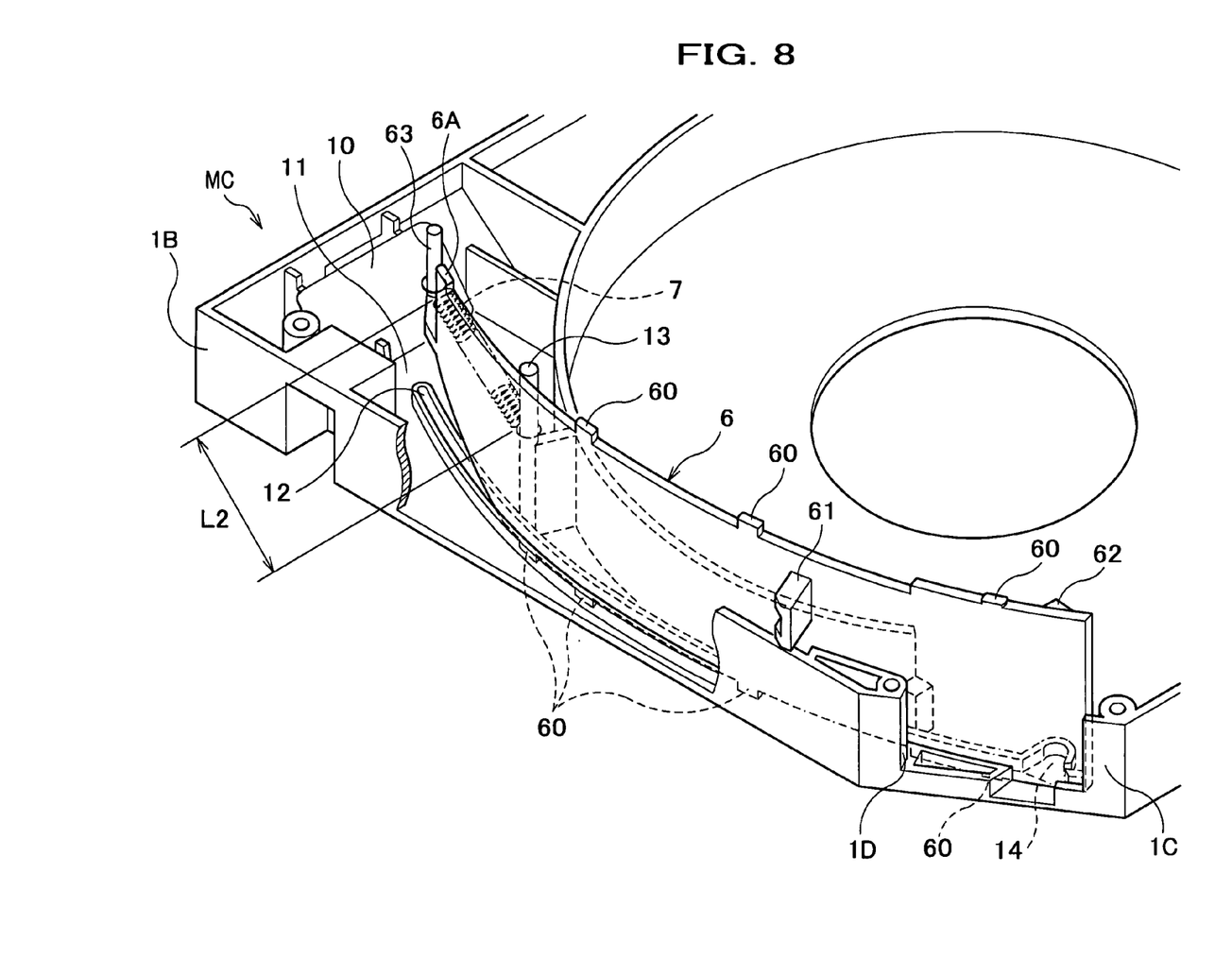
FIG. 8 is a perspective view showing a simultaneously built-in state of the slide door 6 and tensile spring coil 7.

Moreover, the spring holding groove 22 is formed parallel to the door holding groove 21 and laterally long so as to be able to elongate the tensile coil spring 7 in the groove. A groove length L1 of the spring holding groove 22 is set at a length at which the tensile coil spring 7 in the shrunk state can be elongated till a length L2 (see FIGS. 6 and 8), at which the other end 7b of the tensile coil spring 7 can be attached to the case-side spring hooking portion 13 as it is, when the slide door 6 is fitted in the closed position of the guide groove 12. Meanwhile, "a length at which the other end 7b of the tensile coil spring 7 can be attached to the other end 7b of the tensile coil spring 7 in the shrunk state to the case-side spring hooking portion 13 as it is, when the slide door 6 is fitted in the closed position of the guide groove 12" is a length at which the door-side spring hooking portion 63 of the slide door 6 and coil spring 7 hooked between the case-side spring hooking portion 13 energizes the slide door 6 to the closing position, when the slide door 6 and coil spring 7 are built in the lower half 1B.

Then, an assembling method of a magnetic tape cartridge related to the invention is described referring to FIGS. 5 to 8.

An assembling apparatus used for a building-in process of the slide door 6 and tensile coil spring 7, as shown in FIGS. 5 to 7A and 7B, is equipped with a robot hand RH1 gripping the slide door 6 and a spring engaging portion RH2 engaging the coil spring 7. Then, the spring engaging portion RH2 has a pin-shaped top end portion RH2a and an ejector RH2b to push out the other end 7b of the coil spring 7 engaged in the end portion RH2a from there.

Figure 5:
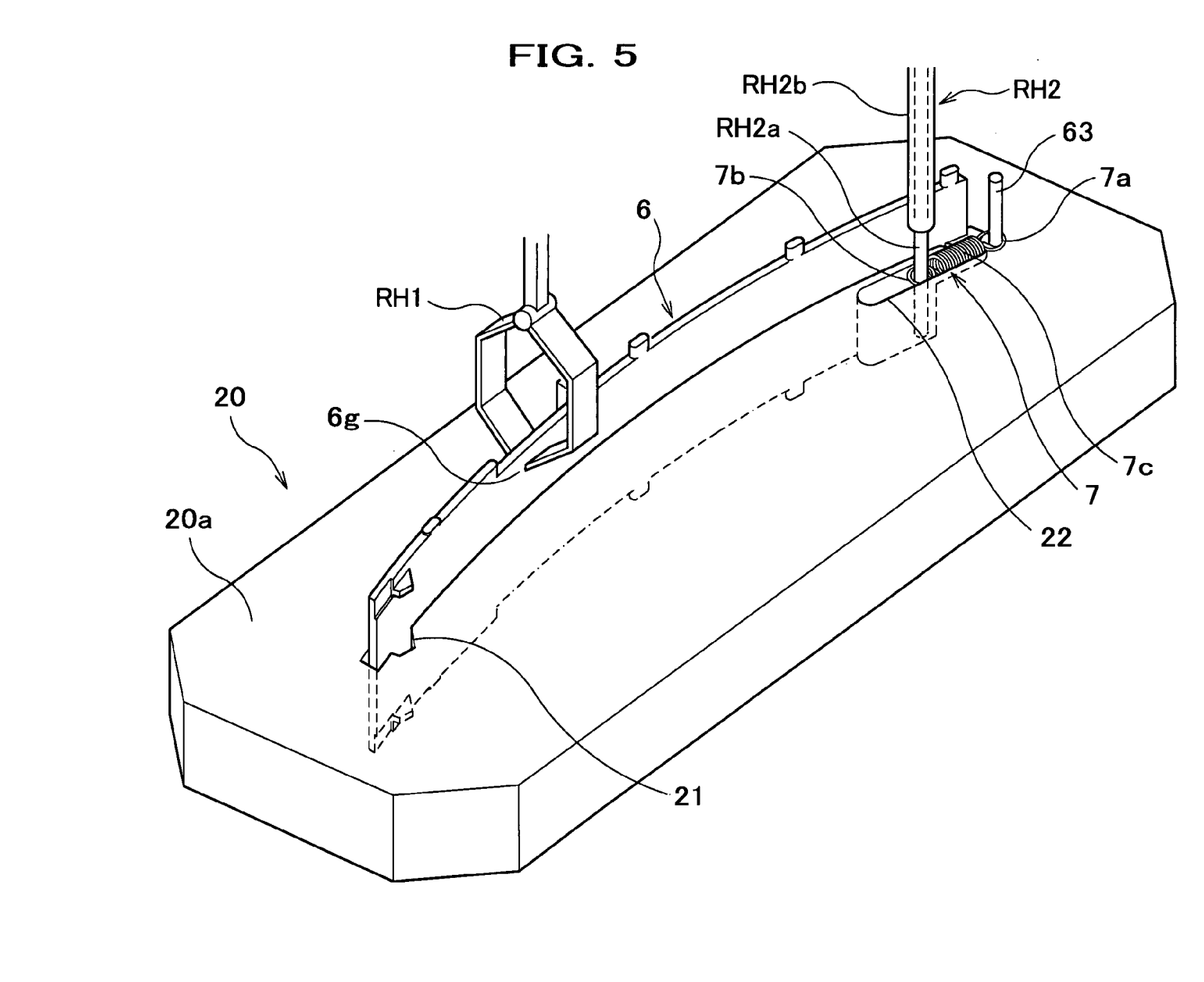
FIG. 5 is a perspective view showing a state in which the slide door 6 and tensile coil spring 7 held with the component holding jig 20 are gripped with a robot hand RH1 of an assembling unit and engaged in a spring engaging portion RH2, respectively.

When building the slide door 6 held with the component holding jig 20 and tensile coil spring 7 in the lower half 1B, firstly, as shown in FIG. 5, grip a middle portion 6g of the slide door 6 with the robot hand RH1. In addition, insert the pin-shaped top end portion RH2a of the spring engaging portion RH2 in the other end 7b like a ring of the tensile coil spring 7, thereby engaging the other end 7b. Then, the coil spring 7 becomes a state in which it is hooked between the door-side spring hooking portion 63 and spring engaging portion RH2. Meanwhile, a position at which the robot hand RH1 grips the slide door 6 is not specifically restricted.

Figure 6:
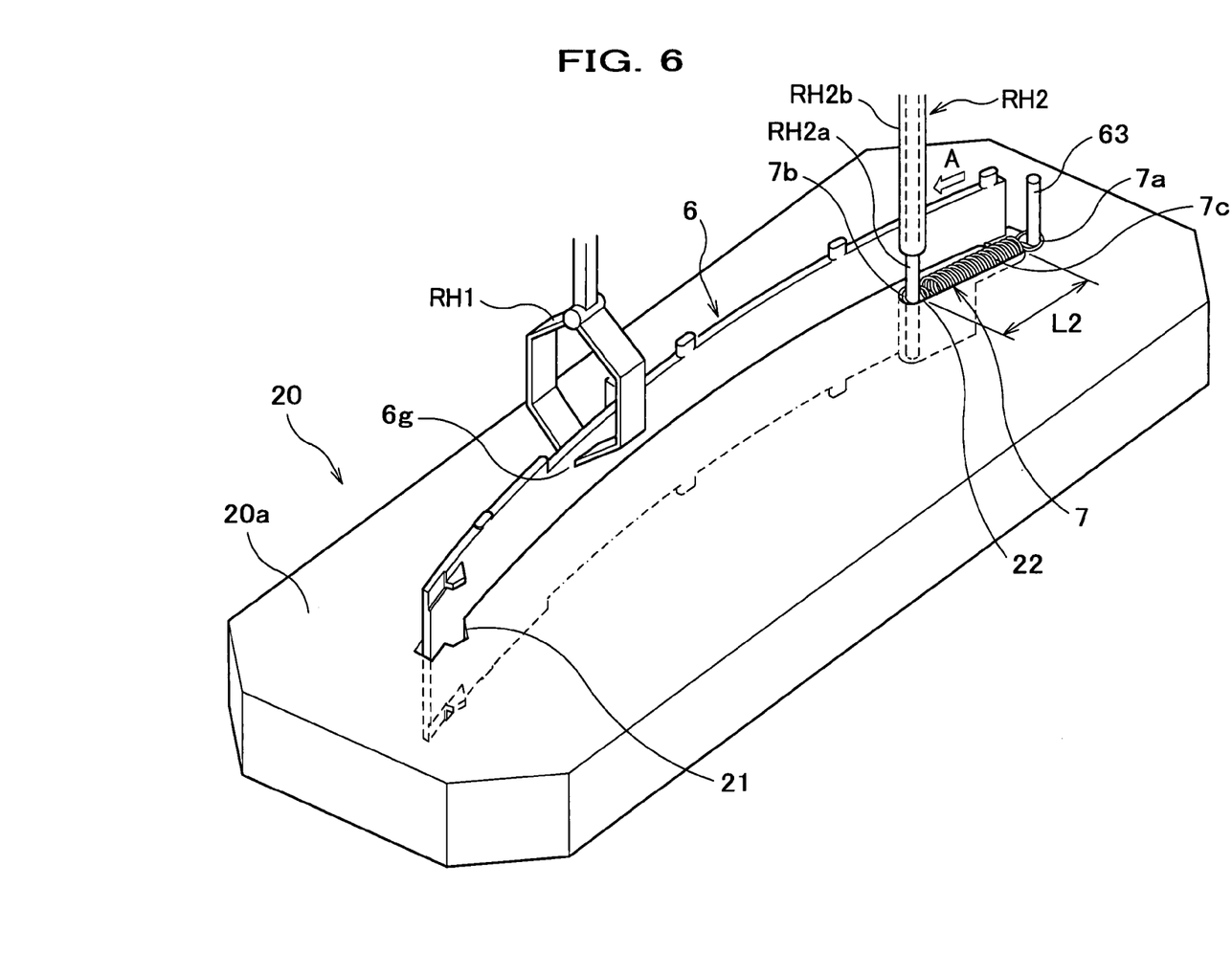
FIG. 6 is a perspective view showing an elongated state of the tensile coil spring 7 in a spring holding groove 22.

Subsequently, as shown in FIG. 6, move the spring engaging portion RH2, of which top end portion RH2a is inserted in the other end 7b of the tensile coil spring 7, along a groove lengthwise direction A of the spring holding groove 22, thereby elongating the coil spring 7 in the groove 22. Then, the spring coil 7 is elongated to the length L2 (see FIGS. 6 and 8) which can attach the other end 7b of the coil spring 7 in the shrunk state to the case-side spring hooking portion 13 as it is when the slide door 6 is fitted in the closed position of the guide groove 12.

Next, vertically move up the robot hand RH1 gripping the slide door 6 and the spring engaging portion RH2 engaging the other end 7b of the tensile coil spring 7 above the component holding jig 20, and lift the slide door 6 and coil spring 7 from the holding jig 20. Then, the coil spring 7 is kept in a state in which it is hooked between the door-side spring hooking portion 63 and spring engaging portion RH2.

Then, after moving the robot hand RH1 and spring engaging portion RH2 above the lower half 1B, vertically move down them toward the inner surface of the lower half 1B, thereby fitting the sliding-use protrusions 60, which is formed in the lower end 6b of the slide door 6 gripped with the robot hand RH1, in the guide groove 12 formed in the inner surface 11 of the lower half 1B. Then, the slide door 6 is fitted in a position of closed state of the guide groove 12. In addition, attach the other end 7b of the tensile coil spring 7 engaged in the spring engaging portion RH2 to the case-side spring hooking portion 13 like a pin formed in the inner surface 11 of the lower half 1B (see FIG. 8).

Figure 7A:
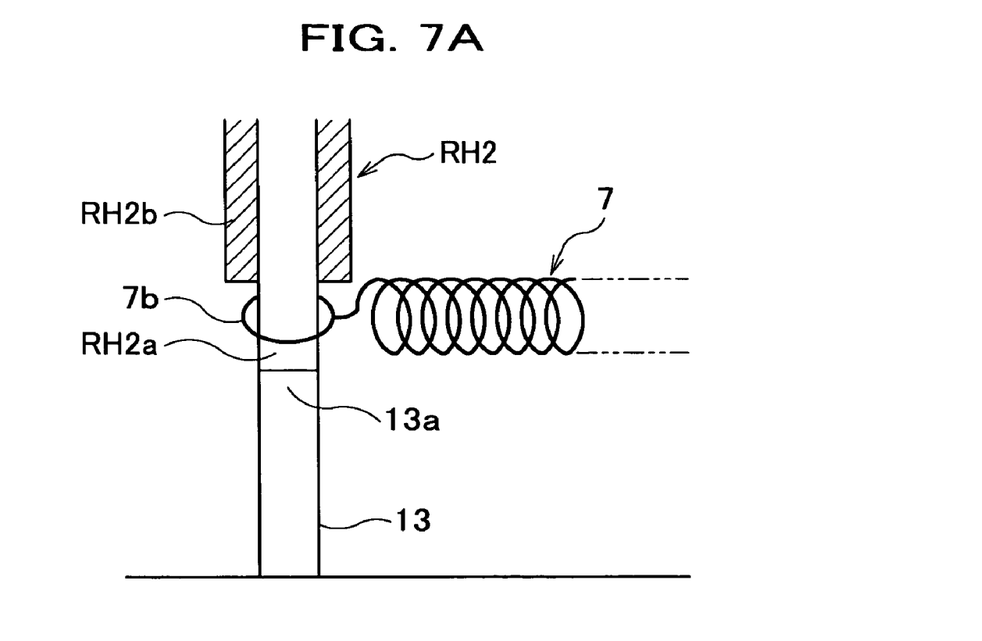
Figure 7B:
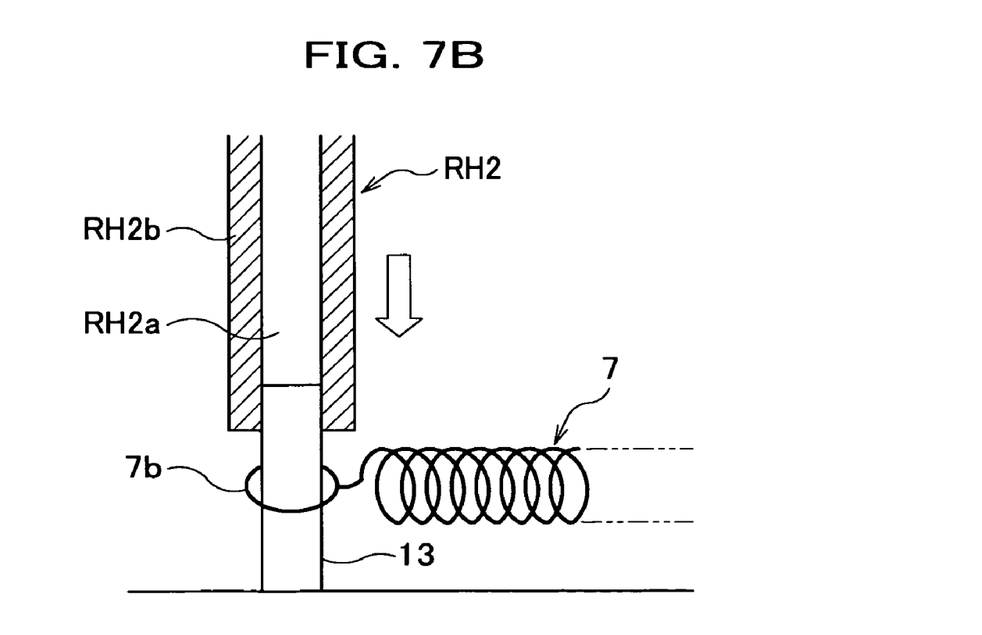
FIG. 7B shows a state in which an ejector RH2b of the spring engaging portion RH2 is slid and the other end 7b of the tensile coil spring 7 is pushed out onto the case-side spring hooking portion 13.

When attaching the other end 7b of the tensile coil spring 7 engaged in the spring engaging portion RH2 to the case-side spring hooking portion 13, firstly, as shown in FIG. 7A, abut the top end portion RH2a of the engaging portion RH2 engaging the other end 7b of the coil spring 7 on the top end 13a of the hooking portion 13. Then, as shown in FIG. 7B, slide the ejector RH2b of the engaging portion RH2 in a direction of the top end portion RH2a, thereby pushing out the other end 7b of the coil spring 7 engaged in the top end portion RH2a into the hooking portion 13. Meanwhile, a slide amount of the ejector RH2b is set so that the other end 7b of the coil spring 7 can be attached to the hooking portion 13.

Then, after moving up the robot hand RH1 which has released the slide door 6 and tensile coil spring 7 above the lower half 1B, return them to predetermined positions, and terminate the building-in work of the slide door 6 and tensile coil spring 7 in the lower half 1B.

Thus, in the assembling of the magnetic tape cartridge, after elongating the tensile coil spring 7 held with the component holding jig 20 to the length L2 (see FIG. 8) which can attach the other end 7b of the coil spring 7 to the case-side spring hooking portion 13 as it is when fitting the slide door in the closed position of the guide groove 12, fit the sliding-use protrusions 60 of the slide door 6 gripped with the robot hand RH1 in the guide groove 12, and attach the other end 7b of the coil spring 7 engaged in the top end portion RH2a of the spring engaging portion RH2 to the case-side spring hooking portion 13, thereby being able to simultaneously build the slide door 6 and coil spring 7 in the lower half 1B.

As a result, it is not necessary to consider problems of position displacement of a door-side spring hooking portion for a cartridge case and a gap between a slide door and case-side spring hooking portion when the slide door set in a guide groove oscillates and/or slants left/right; which problems occur by an assembling method that setting the slide door in the guide groove gripped with a robot hand, then gripping a tensile coil spring with the robot hand, attaching one end of the coil spring to the door-side spring hooking portion, and attaching the other end of the coil spring to the case-side spring hooking portion; whereby automation of assembling work of the door and tensile coil spring can be facilitated.

That is, the assembling method of the present invention includes the following steps: a spring holding step holding the door and tensile coil spring with a component holding jig provided on a transport pallet in advance in a state in which the tensile coil spring is hooked in the door-side spring hooking portion; a spring engaging step gripping a part of the door with a robot hand of an assembling apparatus, and engaging the other end of the tensile coil in a spring engaging portion of an assembling apparatus; a spring elongating step moving the door in a closing direction, elongating the tensile coil spring, and making a state in which the tensile coil spring can be attached to the case-side spring hooking portion as it is when fitting the door in a closing position of the guide groove; and a spring attaching step fitting the door gripped with the robot hand in the closing position of the guide groove, and attaching the other end of the tensile coil spring engaged in the spring engaging portion to the case-side spring hooking portion.

Thus, although one of the embodiments of the present invention is described, the invention is not limited to such the embodiment and various variations are available as far as they are based on the technical ideas of the invention. For example, in the embodiment, although a magnetic tape is used as a recoding medium, an optical recording tape is also available.

What is claimed is:

1. An assembling method of a tape cartridge which is equipped with a cartridge case consisting of an upper half and lower half, a tape pulling-out port formed at a corner of a side wall of said cartridge case, a door with a curved shape opening/closing said tape pulling-out port, a guide groove guiding said door to universally slide in the door's opening/closing directions, a door-side spring hooking portion provided with said door, a case-side spring hooking portion provided in an inner surface of said cartridge case, and a tensile coil spring of which one end is attached to said door-side spring hooking portion and the other end is attached to said case-side spring hooking portion with always energizing said door in the door's closing direction, the method comprising the steps of:

a spring holding step holding said door and said tensile coil spring with a component holding jig provided on a transport pallet in advance in a state in which said tensile coil spring is hooked in said door-side spring hooking portion;

a spring engaging step gripping a part of said door with a robot hand of an assembling apparatus, and engaging the other end of said tensile coil spring in a spring engaging portion of the assembling apparatus;

a spring elongating step moving said door in a closing direction, elongating said tensile coil spring, and making a state in which said tensile coil spring can be attached to said case-side spring hooking portion as it is when fitting said door in a closing position of said guide groove; and a spring attaching step fitting the door gripped with said robot hand in the closing position of said guide groove, and attaching the other end of said tensile coil spring engaged in said spring engaging portion to said case-side spring hooking portion.

2. An assembling method of a tape cartridge according to claim 1, wherein said tape is a magnetic tape.

3. An assembling method of a tape cartridge according to claim 1, wherein said tape is an optical recording tape.

4. An assembling method of a tape cartridge according to claim 1, wherein said spring attaching step slides an ejector of said spring engaging portion in a direction of a top end portion of said spring engaging portion, thereby attaching the other end of said tensile coil spring engaged in the top end portion of said spring engaging portion to said case-side spring hooking portion.

5. An assembling method of a tape cartridge according to claim 4, wherein said tape is a magnetic tape.

6. An assembling method of a tape cartridge according to claim 4, wherein said tape is an optical recording tape.

* * * * *